(12) United States Patent
Karlsen

(10) Patent No.: US 12,234,855 B2
(45) Date of Patent: Feb. 25, 2025

(54) ARRANGEMENT FOR SECURING A NUT

(71) Applicant: Bondura Technology AS, Bryne (NO)

(72) Inventor: Øyvind Karlsen, Stavanger (NO)

(73) Assignee: Bondura Technology AS, Bryne (NO)

( * ) Notice: Subject to any disclaimer, the term of this patent is extended or adjusted under 35 U.S.C. 154(b) by 193 days.

(21) Appl. No.: 17/287,602

(22) PCT Filed: Nov. 21, 2019

(86) PCT No.: PCT/NO2019/050255
§ 371 (c)(1),
(2) Date: Apr. 22, 2021

(87) PCT Pub. No.: WO2020/106161
PCT Pub. Date: May 28, 2020

(65) Prior Publication Data
US 2021/0396268 A1   Dec. 23, 2021

(30) Foreign Application Priority Data
Nov. 23, 2018 (NO) .................................... 20181503

(51) Int. Cl.
*F16B 39/36* (2006.01)
(52) U.S. Cl.
CPC .................................... *F16B 39/36* (2013.01)
(58) Field of Classification Search
CPC .......... F16B 39/36; F16B 39/10; F16B 39/12; F16B 39/16; F16B 39/18
(Continued)

(56) References Cited

U.S. PATENT DOCUMENTS 30,395 A * 10/1860 Edson ..................... F16B 33/06
48,107 A *  6/1865 Smith .................... F16B 37/062
                                                           411/113
(Continued)

FOREIGN PATENT DOCUMENTS

FR           632587         1/1928
GB           181492 A  *    3/1921  ............. F16B 39/36
(Continued)

OTHER PUBLICATIONS

European Search Report for EP 19887218, dated Jun. 30, 2022.
(Continued)

*Primary Examiner* — Jack W Lavinder
*Assistant Examiner* — Dil K. Magar
(74) *Attorney, Agent, or Firm* — Andrus Intellectual Property Law, LLP

(57) ABSTRACT

An arrangement is for securing a nut on a threaded bolt comprising a bolt shaft projecting from a bolt head and being provided, in an opposite end portion, with a first threaded portion arranged to engage with an internal threaded portion of the nut. The nut and the bolt head are arranged to abut against adjacent elements. A nut-locking element is provided with a threaded portion arranged to engage with a second threaded portion of the threaded bolt. The second threaded portion is arranged externally on a stepped end portion of the threaded bolt and is concentric with and having a smaller pitch than the first threaded portion. The nut-locking element is provided with a friction portion arranged to rest supportingly against a corresponding friction portion on the nut.

18 Claims, 4 Drawing Sheets

(58) Field of Classification Search
USPC .................................. 411/265, 222, 214–215
See application file for complete search history.

(56) References Cited

U.S. PATENT DOCUMENTS

| | | | | |
|---|---|---|---|---|
| 148,646 A * | 3/1874 | Atwood | F16B 39/36 | 403/387 |
| 166,957 A * | 8/1875 | Beaton | F16B 39/10 | 411/128 |
| 181,589 A * | 8/1876 | Naylor | F16B 39/36 | 411/935 |
| 411,125 A * | 9/1889 | Kleman | F16B 39/36 | 411/935 |
| 471,796 A * | 3/1892 | Krone | F16B 39/108 | 411/933 |
| 541,159 A * | 6/1895 | Fleischman | F16B 39/12 | 411/956 |
| 556,682 A * | 3/1896 | Larter | F16B 39/32 | 411/230 |
| 646,898 A * | 4/1900 | Deiters | F16B 39/36 | 411/930 |
| 741,747 A * | 10/1903 | Walz | F16B 39/10 | 411/933 |
| 796,900 A * | 8/1905 | Cull | F16B 39/12 | 411/222 |
| 798,996 A * | 9/1905 | Dyer | F16B 39/10 | 411/948 |
| 812,299 A * | 2/1906 | Schmitt | F16B 39/36 | 411/266 |
| 818,584 A * | 4/1906 | Treatt | F16B 39/12 | 411/222 |
| 828,019 A * | 8/1906 | Cronin | F16B 39/10 | 411/926 |
| 844,588 A * | 2/1907 | Gilchrist | F16B 39/10 | 411/326 |
| 890,566 A * | 6/1908 | Luckey | F16B 39/36 | 411/927 |
| 891,512 A * | 6/1908 | Wheelock | F16B 39/128 | 411/238 |
| 894,874 A * | 8/1908 | Bryce | F16B 39/36 | 411/935 |
| 897,168 A * | 8/1908 | Smith | F16B 39/12 | 411/222 |
| 900,462 A * | 10/1908 | Aderer | F16B 39/36 | 411/935 |
| 914,053 A * | 3/1909 | Kenyon | F16B 39/16 | 411/932 |
| 916,298 A * | 3/1909 | Gifford | F16B 39/12 | 411/222 |
| 942,193 A * | 12/1909 | Beltz | F16B 39/10 | 411/948 |
| 1,020,421 A * | 3/1912 | Helsing | F16B 39/36 | 411/269 |
| 1,128,335 A * | 2/1915 | Leeming | F16B 39/10 | 411/927 |
| 1,142,464 A * | 6/1915 | Sparks | F16B 39/32 | 411/935 |
| 1,144,645 A * | 6/1915 | Fehrenz | F16B 39/36 | 411/935 |
| 1,183,251 A * | 5/1916 | Somervell | F16B 39/36 | 411/938 |
| 1,201,444 A * | 10/1916 | Davis | F16B 39/10 | 411/985 |
| 1,212,126 A * | 1/1917 | Canfield | F16B 21/12 | 411/925 |
| 1,240,046 A * | 9/1917 | Hubener | F16B 39/10 | 411/948 |
| 1,241,181 A * | 9/1917 | Wilhelm | F16B 39/108 | 411/215 |
| 1,271,449 A * | 7/1918 | Drake | F16B 39/36 | 411/935 |
| 1,281,709 A * | 10/1918 | Thomassen | F16B 39/12 | 411/222 |
| 1,324,012 A * | 12/1919 | Johnson | F16B 39/36 | 411/270 |
| 1,344,544 A * | 6/1920 | Lorenz | F16B 39/36 | 411/259 |
| 1,346,730 A * | 7/1920 | Viebrock | F16B 39/36 | 411/935 |
| 1,399,191 A * | 12/1921 | Casali | F16B 39/282 | 411/222 |
| 1,404,296 A * | 1/1922 | Howard | F16B 39/36 | 126/9 B |
| 1,452,367 A * | 4/1923 | Ellingson | F16B 39/16 | 411/932 |
| 1,742,722 A * | 1/1930 | Olsson | F16B 39/34 | 411/222 |
| 1,891,358 A * | 12/1932 | Pickop | F16B 39/12 | 411/935 |
| 1,912,888 A * | 6/1933 | Courteille | F16B 39/36 | 411/209 |
| 1,922,378 A * | 8/1933 | Linderman | F16B 39/128 | 411/238 |
| 1,928,982 A * | 10/1933 | Rosenbaum | F16B 39/36 | 411/222 |
| 2,244,400 A * | 6/1941 | Miller | F16B 39/38 | 411/238 |
| 2,690,201 A * | 9/1954 | Fineran | F16B 39/36 | 411/270 |
| 3,385,338 A * | 5/1968 | Morin | F16B 39/36 | 411/935 |
| 3,508,774 A * | 4/1970 | Simonson | F16B 41/002 | 411/999 |
| 3,797,336 A * | 3/1974 | Howe | F16B 37/0857 | 81/125 |
| 3,887,990 A * | 6/1975 | Wilson | B23P 11/02 | 411/222 |
| 4,083,288 A * | 4/1978 | Williams | F16B 37/0892 | 411/436 |
| 4,780,036 A * | 10/1988 | Mao | F16B 39/10 | 411/206 |
| 5,154,560 A * | 10/1992 | Copito | F16B 39/12 | 411/266 |
| 5,544,991 A * | 8/1996 | Richardson | F16B 39/12 | 411/932 |
| 5,865,581 A * | 2/1999 | Sadri | F16B 31/021 | 411/432 |
| 6,095,733 A * | 8/2000 | Busby | F16B 39/34 | 411/428 |
| 7,437,976 B1 * | 10/2008 | Goldbaum | F16B 39/32 | 411/237 |
| 8,621,742 B1 * | 1/2014 | Burton | F16B 39/124 | 29/525.13 |
| 2002/0044849 A1 * | 4/2002 | Wakabayashi | F16B 39/128 | 411/222 |
| 2005/0025607 A1 * | 2/2005 | Guantonio | F16B 39/12 | 411/222 |
| 2007/0048107 A1 * | 3/2007 | Johnson | B23P 9/025 | 411/181 |
| 2012/0070246 A1 * | 3/2012 | Peng | F16B 39/36 | 411/246 |
| 2013/0280965 A1 * | 10/2013 | Kojyo | F16B 35/045 | 411/389 |
| 2017/0030395 A1 * | 2/2017 | Pattinson | C23C 16/06 | |

FOREIGN PATENT DOCUMENTS

| | | | |
|---|---|---|---|
| GB | 181492 | 6/1922 | |
| JP | 2003184845 A * | 7/2003 | ............. F16B 35/00 |
| JP | 5093414 B1 * | 12/2012 | ............. F16B 35/00 |
| JP | 5360848 | 12/2013 | |
| JP | 2014126159 A * | 7/2014 | ............. F16B 39/12 |
| WO | 2017034414 | 3/2017 | |

OTHER PUBLICATIONS

Norwegian Search Report for No. 20181503, dated Jun. 22, 2019.

(56) References Cited

OTHER PUBLICATIONS

International Search Report and the Written Opinion for PCT/NO2019/050255, dated Feb. 10, 2020.

* cited by examiner

ARRANGEMENT FOR SECURING A NUT

CROSS-REFERENCE TO RELATED APPLICATIONS

This application is the U.S. national stage application of International Application PCT/NO2019/050255, filed Nov. 21, 2019, which international application was published on May 28, 2020, as International Publication WO 2020/106161 in the English language. The International Application claims priority of Norwegian Patent Application No. 20181503, filed Nov. 23, 2018. The international application and Norwegian application are both incorporated herein by reference, in entirety.

FIELD

The invention relates to an arrangement for securing a nut on a threaded bolt comprising a bolt shaft projecting from a bolt head and being provided, at an opposite end portion, with a first threaded portion arranged to engage with an internal threaded portion of the nut, the nut and the bolt head being arranged to abut against adjacent elements, where a nut-locking element is provided with a threaded portion arranged to engage with a second threaded portion of the threaded bolt, the second threaded portion being arranged externally on a stepped end portion of the threaded bolt and being concentric with and having a smaller pitch than the first threaded portion, and the nut-locking element being provided with a friction portion arranged to rest supportingly against a corresponding friction portion on the nut.

BACKGROUND

Attempts to prevent a nut from coming loose from its abutment against an element which is held together with an adjacent element by means of said nut and an associated threaded bolt have been made by means of a wide range of arrangements, among other things by increasing the friction between the threads of the nut and the bolt. The closest prior art is forming the nut as a clamping nut; that is to say, at least parts of an outward-facing end portion of the nut rest more tightly against the threads of the bolt than the threads of the nut, typically by the nut being provided with an oval collar portion. A so-called nyloc nut comprises an integrated plastic ring in its outward-facing end portion, of a smaller diameter than the threads of the nut. Further known arrangements for locking a nut comprise the use of a locking element engaging with both the nut and the bolt, for example a locking pin having been passed through a radial bore in the bolt and engaging with cut-outs in a nut of the type called a castellated nut, or a lock washer engaging with, for example, an axial groove in the bolt in a manner preventing rotation and being bent into abutment against the polygonal jacket of the nut.

It is also known to use a so-called counternut; a second nut being screwed into abutment against a first nut, that is. The counternut may have a dimension which is equal to or smaller than that of the main nut (the first nut).

SUMMARY

The invention has for its object to remedy or reduce at least one of the drawbacks of the prior art or at least provide a useful alternative to the prior art.

The object is achieved through the features that are specified in the description below and in the claims that follow.

The invention provides an arrangement for securing a nut on a threaded bolt by a nut-locking element being arranged to releasably engage with the threaded bolt and the nut that is in engagement with a first threaded portion of the threaded bolt. The threaded bolt includes a second threaded portion which is concentric with the first threaded portion and has a pitch which is smaller than the pitch of the first threaded portion of the threaded bolt. The different pitches result in the fact that if an attempt is made to screw the nut outwards, it thereby trying to pull the nut-locking element along in the rotation, the nut will have a greater axial movement than the nut-locking element. The nut is thereby pressed against the nut-locking element so that the nut is prevented from coming loose.

The second threaded portion is formed as external threads on a stepped end portion of the threaded bolt. The nut-locking element comprises a friction portion that, by abutment against a portion of the nut, restrains the nut from rotating relative to the nut-locking element. To further enhance the locking effect of the nut-locking element, the threaded connection of the nut-locking element to the threaded bolt may be formed with a friction-enhancing shape or surface. It is also specified that the second threaded portion may be formed as internal threads in a bore in an end portion of the threaded bolt.

It is specified that the friction portion of the nut-locking element may be formed as an external cylindrical portion which surrounds a conical section of the end portion of the threaded bolt and which, by the abutment of an internal conical portion against the conical section of the threaded-bolt end portion, is expandable into abutment against a portion of the centre bore of the nut, typically a portion of the threads of the nut or some other abutment surface arranged in the centre bore of the nut near the end of the nut that faces the nut-locking element. Alternatively, the friction portion may be formed on a salient end portion of the nut-locking element, arranged to be brought into abutment against an external portion of the nut. In this embodiment, the friction portion of the nut-locking element may be formed as an annular collar end face lying in a plane arranged perpendicularly to the centre axis of the nut, or as a conical inward-facing surface. The friction portion may possibly consist of a circular transition portion between the collar end face and an inward-facing collar surface which, in this embodiment variant, may be cylindrical. Correspondingly, the external abutment portion of the nut may be an annular end-portion face lying in a plane arranged perpendicularly to the centre axis of the nut or being formed as an outward-facing conical surface on the end portion of the nut, or the abutment portion may possibly consist of a circular transition portion between the end-portion face of the nut and the outward-facing conical surface, possibly between the end-portion face of the nut and an external cylinder surface of the nut. The nut-locking element comprises a coupling portion arranged in the outward-facing end portion of the nut-locking element for releasable connection to a tool, for example in the form of an external, polygonal end portion or a centric recess with a polygonal cross section.

In one embodiment of the invention, an end portion of the nut is provided with a conical friction portion, and an elongated, sleeve-shaped end portion of the nut-locking element has an internal diameter which exceeds the outer diameter of the first threaded portion and is arranged to surround the part of the first threaded portion that is outside the nut, and the sleeve-shaped end portion has a conical end face which is complementary to the friction portion of the nut.

The friction portion of the nut-locking element and the facing abutment portion of the nut are preferably formed with friction-enhancing surfaces, for example by said surfaces being machined with great roughness, being serrated or being coated with a friction-enhancing material.

The threads of the threaded bolt and the nut are preferably formed with friction-reducing thread surfaces and/or an friction-reducing thread shape, for example by said threads being coated with an friction-reducing material, for example a Xylan® coating.

The invention is defined by the independent claim. The dependent claims define advantageous embodiments of the invention.

The invention relates, more specifically, to an arrangement for securing a nut on a threaded bolt that comprises a bolt shaft projecting from a bolt head and being provided, at an opposite end portion, with a first threaded portion arranged to engage with an internal threaded portion on the nut, the nut and the bolt head being arranged to abut against adjacent elements, where a nut-locking element is provided with a threaded portion arranged to engage with a second threaded portion of the threaded bolt, the second threaded portion being concentric with and having a smaller pitch than the first threaded portion, and the nut-locking element being provided with a friction portion arranged to rest supportingly against the nut, characterized by the nut being provided with an outward-facing conical abutment surface falling towards the second threaded portion of the end portion, and the nut-locking element being provided with an internal, conical abutment surface which is complementary to the conical abutment surface of the nut and forms the friction portion of the nut-locking element.

The nut-locking element may be provided with a coupling portion which is arranged to receive a screwing tool, it being formed as an end portion with an externally polygonal cross section or as an end portion with an internally polygonal recess.

The first threaded portion of the threaded bolt and the threaded portion of the nut may be formed with friction-reducing thread surfaces and/or an friction-reducing thread shape.

The first threaded portion of the threaded bolt and the threaded portion of the nut may advantageously be coated with an antifriction material.

The threaded portion of the nut-locking element may be formed in an axial through bore in the nut-locking element.

The threaded portion of the nut-locking element may be formed in a non-through bore in the nut-locking element, the nut-locking element being formed with a closed outward-facing end portion and surrounding the second threaded portion.

It is also specified that the second threaded portion may be arranged externally on a stepped end portion of the threaded bolt and may be separated from the first threaded portion by a conical transition portion, and the nut-locking element may be provided with an internal conical surface which is arranged to rest against the conical transition portion and is surrounded by a cylindrical surface which, by radial expansion, is arranged to rest supportingly against a surrounding portion of the nut. A portion of the nut-locking element which is defined by the internal, conical surface, may alternatively be arranged to expand radially.

It is also specified that the second threaded portion may be arranged in a centric, axial cut-out in the end portion of the threaded bolt, the threaded portion of the nut-locking element being arranged externally on a peg, the nut-locking element being provided with a salient end portion, and the friction portion being arranged near the periphery of the salient end portion. Possibly, the friction portion may be formed as an annular collar end face lying in a plane that is perpendicular to the centre axis of the nut or be formed as an internal conical surface on the salient end portion, or be formed as an edge portion between two faces on the salient end portion.

It is also specified that the nut may be provided with an abutment portion for receiving the friction portion of the nut-locking element, the abutment portion being formed as a stepped end portion of the nut.

BRIEF DESCRIPTION OF THE DRAWINGS

In what follows, examples of preferred embodiments are described, which are visualized in the accompanying drawings, in which.

DETAILED DESCRIPTION OF THE DRAWINGS

Figure 1:
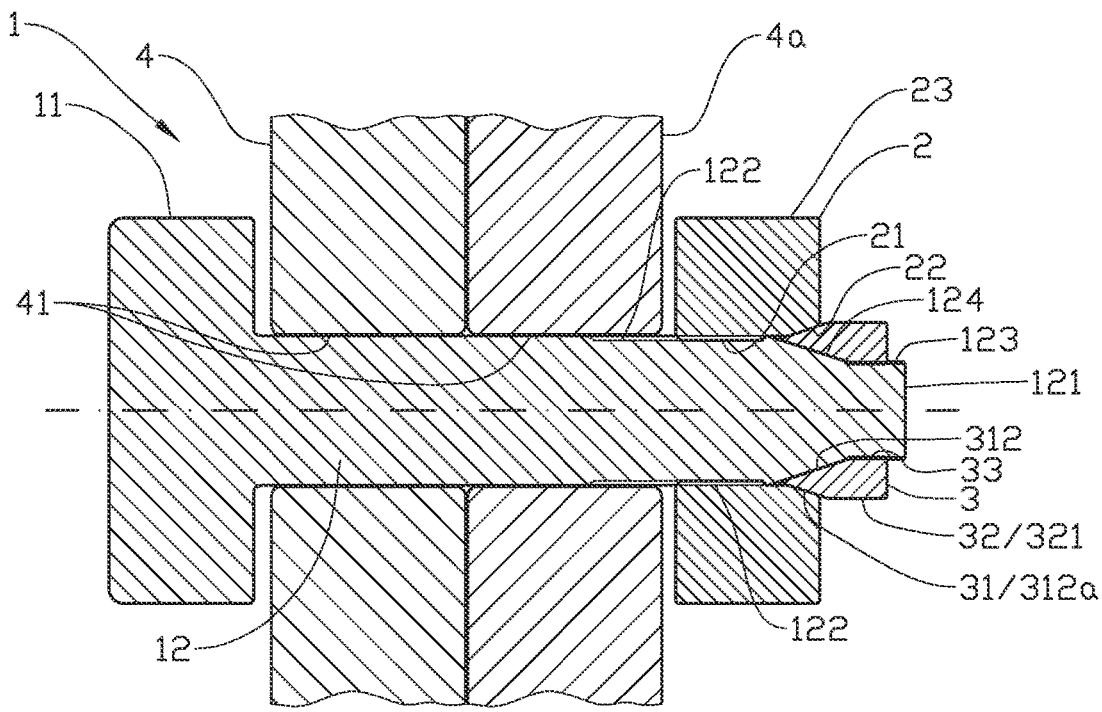
FIG. 1 shows an axial section through a portion of a threaded bolt with a nut which is secured by means of a first embodiment of a nut-locking element.

In the figures, the reference numeral 1 indicates a threaded bolt provided with a bolt head 11 and a bolt shaft 12. A first threaded portion 122 is arranged externally on the bolt shaft 12. In FIGS. 1-6, the threaded bolt 1 is shown arranged in bores 41 in two elements 4, 4a that are to be joined by means of the threaded bolt 1 and a nut 2. The nut 2 is provided with an internal nut-thread portion 21, which is adapted for engagement with the first threaded portion 122 of the threaded bolt 1, and an external engagement portion 23 for a tightening tool, not shown, typically of a polygonal cross section, especially a hexagonal cross section.

A nut-locking element 3 is arranged on a second threaded portion 123 on the end portion 121 of the threaded bolt 1. The second threaded portion 123 has a smaller pitch than the first threaded portion 122. When the nut-locking element 3 has been screwed into abutment against the nut 2, the difference in pitch will prevent the nut 2 and the nut-locking element 3 from rotating together in such a way that the abutment of the nut against the adjacent element 4*a* ceases.

The connection between the nut 2 and the nut-locking element 3 may be provided in various ways.

Reference is made first to FIG. 1, in which a first exemplary embodiment is shown. Here, the end portion 121 of the threaded bolt 1 is stepped, and the second threaded portion 123 is arranged outside the first threaded portion 122 and with a smaller diameter than the first threaded portion 122, but with the same thread direction as the first threaded portion 122. A conical transition portion 124 is formed between the first and the second threaded portions 122, 123, providing an abutment surface for an internal, conical surface 312 of the nut-locking element 3. An external, conical surface 312*a* surrounding the internal, conical surface 312 forms a friction portion 31 which is arranged to rest against a surrounding end portion of the threaded portion 21 of the nut 2, possibly against an internal abutment portion 22 formed as an extension of the nut-thread portion 21, shown here as a conical abutment portion in the mouth of the threaded bore of the nut 2. The conical portions 312, 312*a* of the nut-locking element 3 may be radially expandable. The expansion is enabled by the nut-locking element 3 being formed of an elastic material, and possibly by one or more slits directed axially (not shown) cutting the conical portions 312, 312*a*.

Adjacent to the friction portion 31, the nut-locking element 3, in this embodiment, is provided with a coupling portion 32 surrounding a threaded portion 33 arranged to engage with the second threaded portion 123 on the stepped part of the bolt shaft 12. In this embodiment, the coupling portion 32 is provided with an externally polygonal end portion 321.

Figure 2:
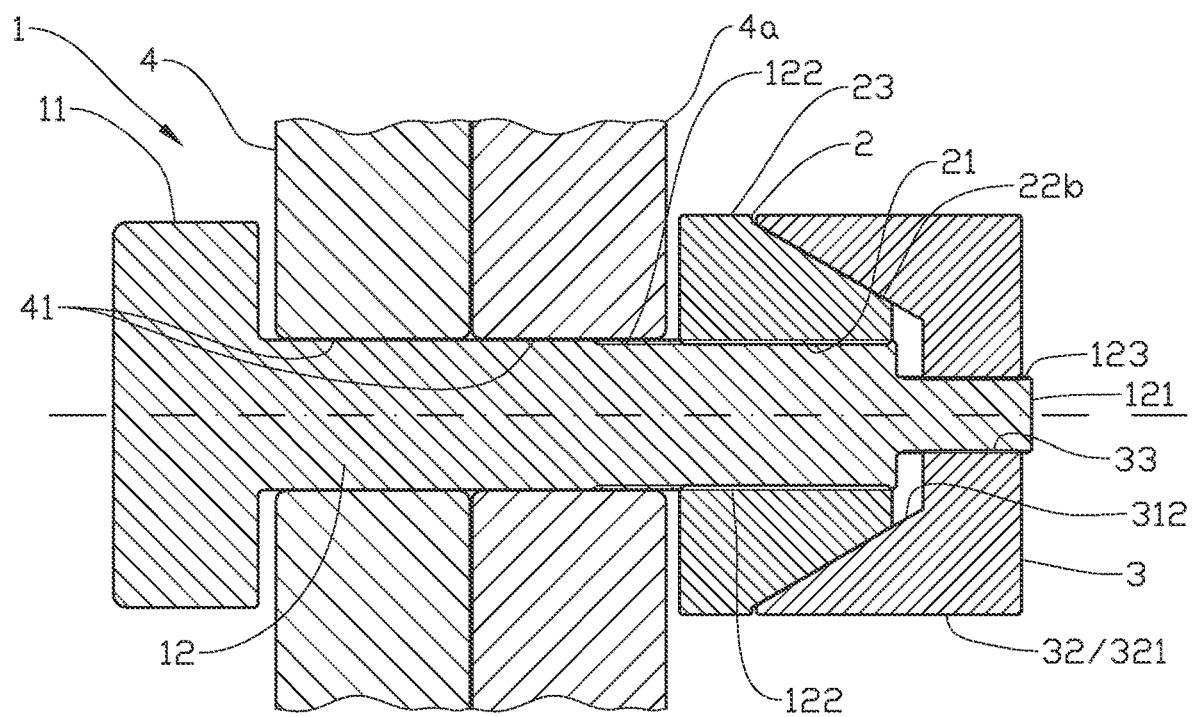
FIG. 2 shows an axial section through a portion of a threaded bolt with a nut which is secured by means of a second embodiment of the nut-locking element.

FIG. 2 shows an exemplary embodiment in which the nut 2 is provided with an outward-facing conical abutment surface 22*b* which falls towards the stepped end portion 121 of the threaded bolt 1 and is complementary to an internal, conical abutment surface 312 on the nut-locking element 3 which, in this embodiment, is salient.

The bore with the internal threaded portion 33 in the nut-locking element 3 according to FIGS. 1 and 2 is not restricted to extending axially through the nut-locking element 3, as the nut-locking element 3 may also be formed with a closed outward-facing end portion, so that the nut-locking element 3 completely encloses the stepped part of the bolt shaft 12.

Reference is now made to FIGS. 3, 4, 5 and 6, in which variants of a second embodiment of the invention are shown. The variants of this embodiment have in common that the second threaded portion 123 of the end portion 121 of the threaded bolt 1 is formed internally in a centric cut-out 125, and that the nut-locking element 3 includes a salient, circular end portion 311 which, when the nut 2 is locked, is resting against a circular abutment portion 22 on the nut 2. In this embodiment, the threaded portion 33 of the nut-locking element 3 is provided on a cylindrical peg 34 arranged centrically.

Figure 3:
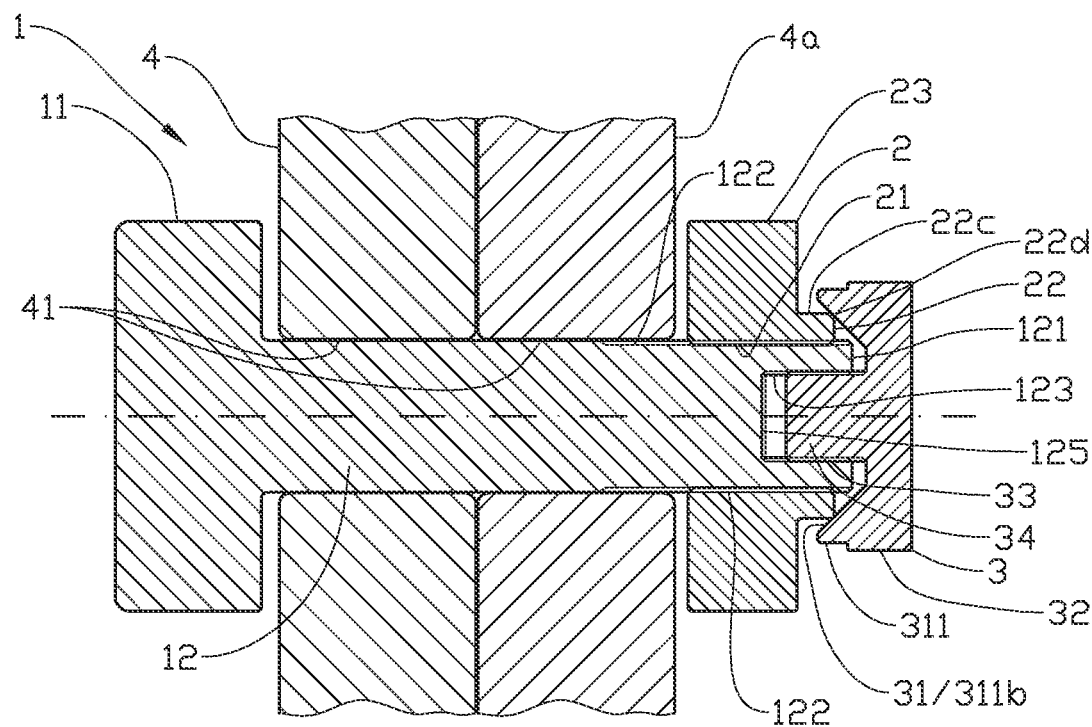
FIG. 3 shows an axial section through a portion of a threaded bolt with a nut which is secured by means of a third embodiment of the nut-locking element.

In FIG. 3, the salient end portion 311 of the nut-locking element 3 is provided with a friction portion 31 formed as an internal, conical surface 311*b* resting against a circular edge portion 22*d* between an outward-facing, stepped abutment portion 22 and an external cylinder surface 22*c* on the end of the nut 2.

Figure 4:
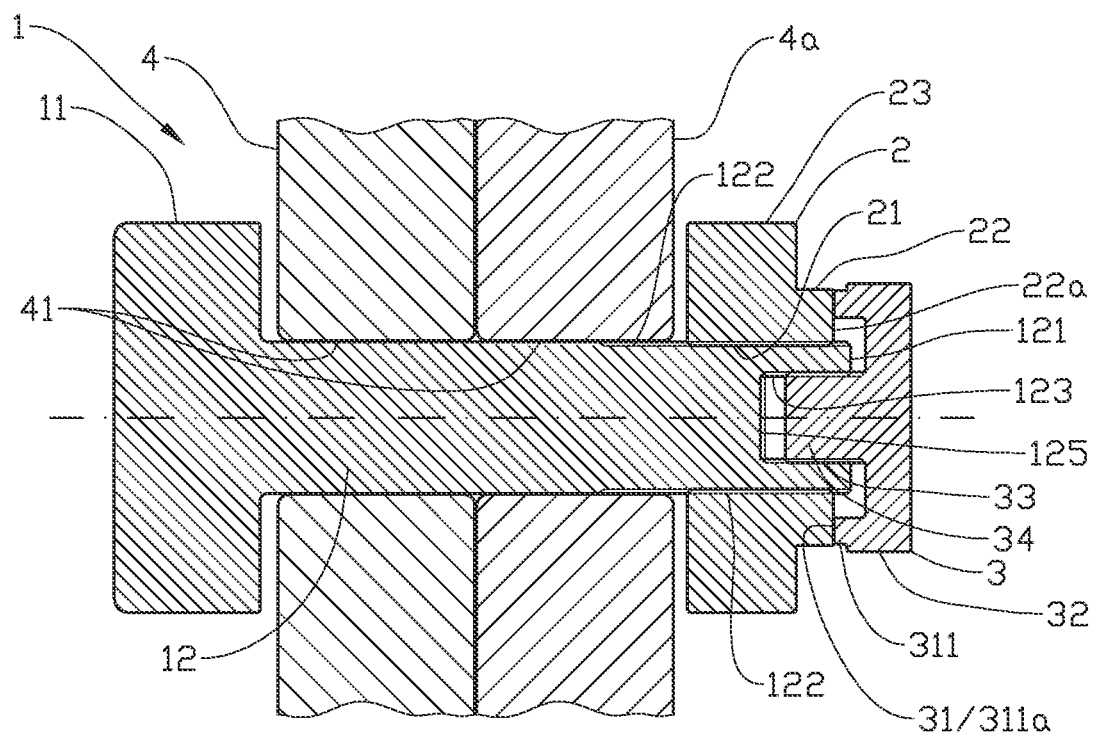
FIG. 4 shows an axial section through a portion of a threaded bolt with a nut which is secured by means of a variant of the third embodiment of the nut-locking element.

In FIG. 4, the salient end portion 311 of the nut-locking element 3 is provided with a friction portion 31 formed as an annular collar end face 311*a* lying in a plane perpendicular to the centre axis of the nut-locking element 3 and abutting against an end face 22*a* of the outward-facing, stepped abutment portion 22 of the nut 2.

Figure 5:
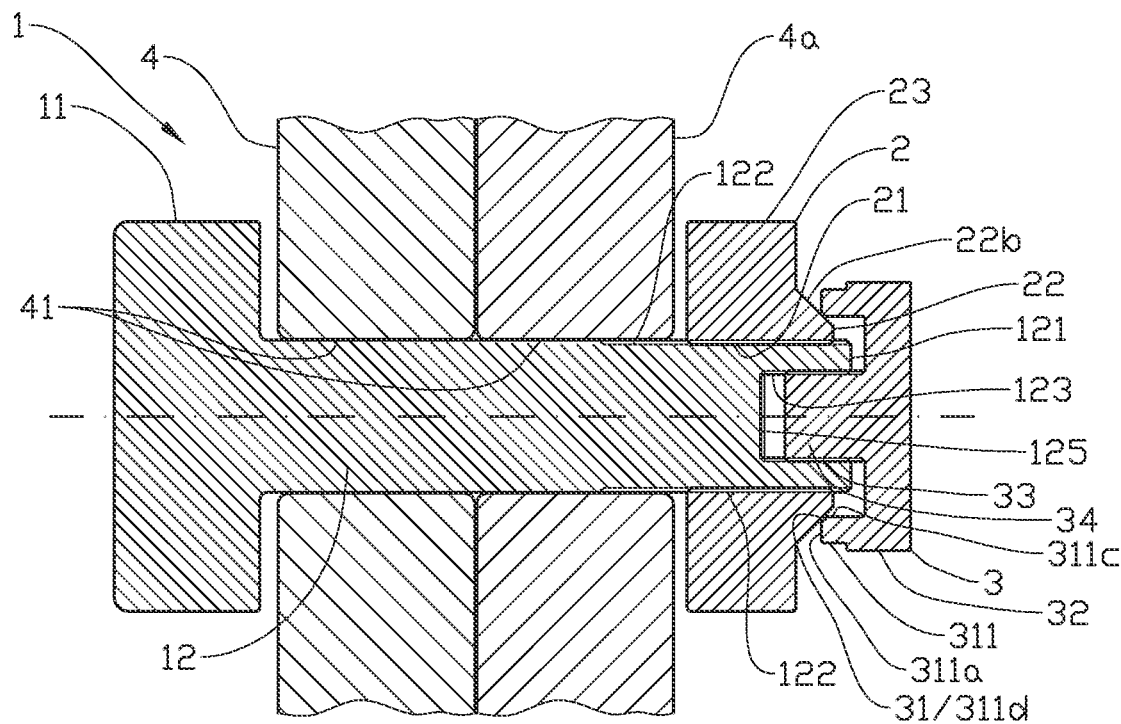
FIG. 5 shows an axial section through a portion of a threaded bolt with a nut which is secured by means of another variant of the third embodiment of the nut-locking element.

In FIG. 5, the salient end portion 311 of the nut-locking element 3 is provided with a friction portion 31 formed by an edge portion 311*d* between an annular collar end face 311*a* and an internal cylinder surface 311*c*, the edge portion 311*d* abutting against an external, conical abutment surface 22*b* on the outward-facing, stepped abutment portion 22 of the nut 2.

Figure 6:
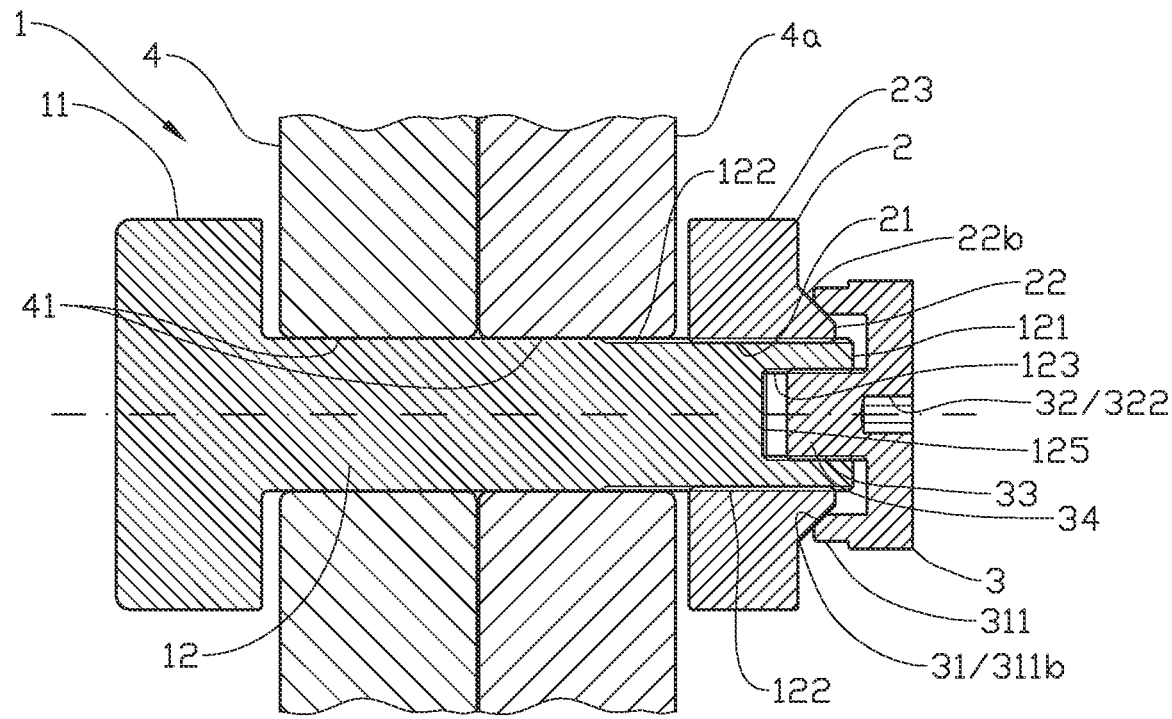
FIG. 6 shows an axial section through a portion of a threaded bolt with a nut which is secured by means of still another variant of the third embodiment of the nut-locking element.

In FIG. 6, the salient end portion 311 of the nut-locking element 3 is provided with a friction portion 31 formed as an internal, conical surface 311*b* abutting against an external, conical abutment surface 22*b* on the outward-facing stepped abutment portion 22 of the nut 2.

The nut-locking element 3 according to the embodiments shown in FIGS. 3, 4 and 5 is provided with a coupling portion 32 for a screwing tool (not shown), shown here as an externally polygonal end portion 321. In FIG. 6, the coupling portion 32 is formed as an internally polygonal end-portion recess 322 arranged centrically in the nut-locking element 3.

When the elements 4, 4*a* have been clamped to each other by means of the threaded bolt 1 and the nut 2, and the nut-locking element 3 has been clamped against the nut 2, the smaller pitch of the second threaded portion 123 of the threaded bolt 1 and the corresponding threaded portion 33 of the nut-locking element 3 will ensure that the nut-locking element 3 is further clamped against the nut 2 if the nut tends to become screwed away from its abutment against the element 4*a*. The invention has thereby provided a simple and effective securing of the nut 2 on the threaded bolt 1.

For all the embodiments in which opposite, conical abutment surfaces, that is to say the conical abutment surface 22*b* of the nut 2 and/or of the transition portion 124 between the two external threaded portions 122, 123 of the threaded bolt 1 and the facing internal or external conical abutment surfaces 311*b*, 312 of the nut-locking element 3, it is an advantage to use conical surfaces having a relatively small pitch to provide a large friction portion. An advantageous pitch angle then typically lies in the range of 25-35 degrees to the centre-axis direction of the threaded bolt 1, the nut 2 and the nut-locking element 3. In FIG. 2, the pitch angle shown is about 30 degrees.

Figure 7:
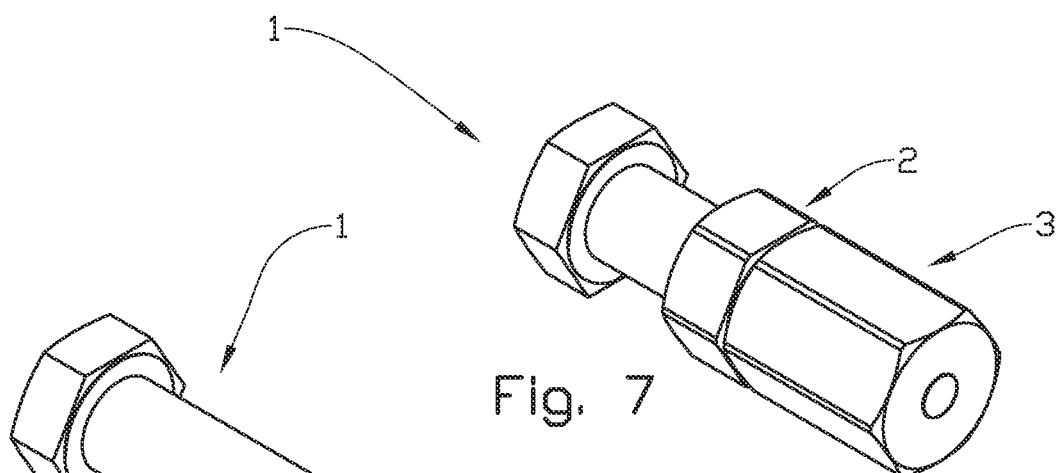
FIG. 7 shows a perspective view, on a smaller scale, of an assembled arrangement of the first embodiment of the threaded bolt with a fourth embodiment of the nut-locking element.
Figure 8:
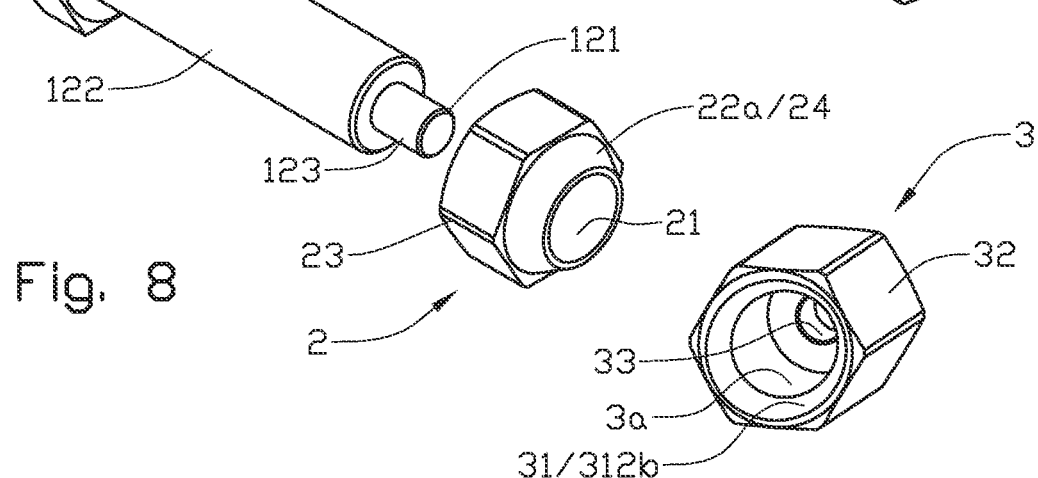
FIG. 8 shows an exploded perspective drawing of the arrangement of FIG. 7.
Figure 9:
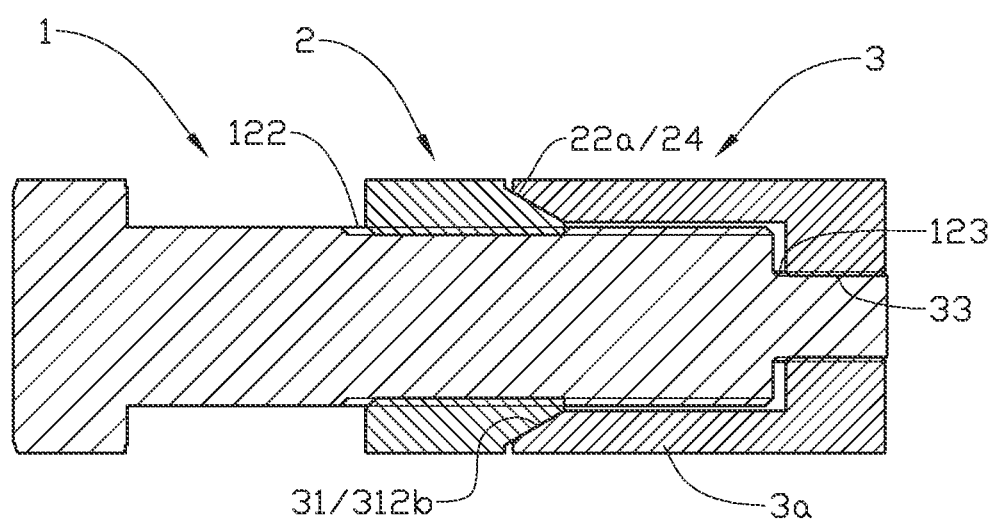
FIG. 9 shows an axial section through the arrangement of FIG. 7.

Reference is now made to FIGS. 7, 8 and 9 which show an arrangement with another exemplary embodiment of the nut 2 and the nut-locking element 3.

The end portion 121 of the threaded bolt 1 is stepped, and the second threaded portion 123 is arranged outside the first threaded portion 122 and with a smaller diameter than the first threaded portion 122, but with the same thread direction as the first threaded portion 122.

The outward-facing end of the nut 2 is provided with a conical first abutment surface 22*a*, shown here as tapering from the external engagement portion 23 of the nut 2 for the tightening tool, not shown, typically of a polygonal cross section, especially a hexagonal cross section.

The nut-locking element 3 is provided with an internal threaded portion 33 arranged to engage with the second threaded portion 123 of the threaded bolt 1. The nut-locking element 3 is provided with a sleeve-shaped end portion 3*a* with an internal diameter larger than that of the first threaded portion 122 of the threaded bolt 1. The end portion 3*a* is provided with a conical second abutment surface 312*b*, shown here as an internal conical surface rising towards the end of the nut-locking element 3, complementary to and arranged to rest supportingly against the conical first abutment surface 22a of the nut 2.

The conical first abutment surface 22a of the nut 2 and the conical second abutment surface 312b of the nut-locking element 3 form cooperating friction portions 24, 31.

The sleeve-shaped end portion 3a of the nut-locking element 3 has a length sufficiently large to extend over the part of the first threaded portion 122 of the threaded bolt 1 that projects from the nut 2 when the nut 2 and the bolt head 11 have been tightened against the elements 4, 4a that are to be joined. The first threaded portion 122 of the threaded bolt 1 has a length which is sufficiently large for an axial-tension tool (not shown) to engage with the part of the first threaded portion 122 of the threaded bolt 1 that projects from the nut 2, to tension the threaded bolt 1 in the axial direction, so that the nut 2 may be rotated into abutment against the respective element 4a at a moderate torque. When the axial-tension tool then relieves the threaded bolt 1, the axial tensioning of the bolt 1 will be maintained by the abutments of the nut 2 and the bolt head 11 against the elements 4, 4a, without it having been necessary to apply a great torque to the threaded bolt 1 and the nut 2.

The nut 2 is then secured by the sleeve-shaped end portion 3a of the nut-locking element 3 being slipped over the projecting first threaded portion 122 of the threaded bolt 1, and the nut-locking element 3 being rotated into engagement between the internal threaded portion 33 of the nut-locking element 3 and the second threaded portion 123 of the threaded bolt 1 until the conical second abutment surface 312b of the nut-locking element 3 rests supportingly and lockingly against the conical first abutment surface 22a of the nut 2.

It is obvious that even if the conical abutment surfaces 22a, 312a of the nut 2 and nut-locking element 33 are shown in FIGS. 7-9 as respectively external and internal conical portions, they may be formed in the opposite order to that shown in the drawings; that is to say, the first abutment surface 22a of the nut 2 may be internally conical and the second abutment surface 312a of the nut-locking element 3 may be externally conical.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive. The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. An arrangement comprising a threaded bolt and a nut, the arrangement being configured to secure the nut on the threaded bolt, wherein the threaded bolt comprises an axially elongated bolt shaft projecting from a bolt head and a first threaded portion arranged to engage with an internal threaded portion of the nut, the nut and the bolt head being arranged to abut against adjacent elements, wherein the arrangement further comprises a nut-locking element comprising a threaded portion arranged to engage with a second threaded portion of the threaded bolt, the second threaded portion being arranged externally on a stepped end portion of the threaded bolt, the second threaded portion having a smaller diameter than the first threaded portion and being concentric with the first threaded portion,
wherein the nut comprises an end portion having a conical first abutment surface which forms a first friction portion, and the nut-locking element comprises an end portion having a conical second abutment surface which is complementary to the conical first abutment surface, the conical second abutment surface forming a second friction portion arranged to rest supportingly against the first friction portion,
wherein the end portion of the nut-locking element comprises an elongated, sleeve-shaped portion axially extending between the conical second abutment surface of the nut-locking element and the threaded portion of the nut-locking element, and having an axial through-bore with an internal diameter which is larger than that of the first threaded portion of the threaded bolt and is arranged to surround part of the first threaded portion and extend towards the nut,
wherein a wall of the axial through-bore along the internal diameter extends at an angle relative to the conical first abutment surface,
wherein the second threaded portion has a smaller pitch than the first threaded portion, and
wherein the first threaded portion and the second threaded portion have same thread directions.

2. The arrangement according to claim 1, wherein the first threaded portion of the threaded bolt has an axial extent outside the nut sufficiently large to form an engagement portion for an axial-tension tool arranged to apply an axial tensioning to the threaded bolt at a distance from the nut during a tightening of the nut against a nearest one of the adjacent elements.

3. The arrangement according to claim 1, wherein the conical first abutment surface of the nut is conically tapering externally from an external engagement portion on a periphery of the nut, and the conical second abutment surface of the nut-locking element is conically tapering internally from the end portion of the nut-locking element.

4. The arrangement according to claim 1, wherein a periphery of the nut-locking element forms a coupling portion which is arranged to receive a screwing tool and is formed with an externally polygonal cross section.

5. The arrangement according to claim 4, wherein the coupling portion extends over an entire axial length of the nut-locking element.

6. The arrangement according to claim 1, wherein the first threaded portion of the threaded bolt and the threaded portion of the nut is formed with friction-reducing thread surfaces and/or a friction-reducing thread shape.

7. The arrangement according to claim 6, wherein the first threaded portion of the threaded bolt and the threaded portion of the nut are coated with an antifriction material.

8. The arrangement according to claim 1, wherein the threaded portion of the nut-locking element is formed in an axial through bore in the nut-locking element.

9. The arrangement according to claim 1, wherein the threaded portion of the nut-locking element is formed as a non-through bore in the nut-locking element, the nut-locking element being formed with a closed outward-facing end portion and surrounding the second threaded portion.

10. An arrangement comprising a threaded bolt and a nut, the arrangement being configured to secure the nut on the threaded bolt, wherein the threaded bolt comprises an axially elongated bolt shaft projecting from a bolt head and a first threaded portion arranged to engage with an internal threaded portion of the nut, the nut and the bolt head being arranged to abut against adjacent elements, wherein the arrangement further comprises a nut-locking element comprising a threaded portion arranged to engage with a second threaded portion of the threaded bolt, the second threaded portion being arranged externally on a stepped end portion of the threaded bolt, the second threaded portion having a smaller diameter than the first threaded portion and being concentric with the first threaded portion, wherein the nut comprises an end portion having a conical first abutment surface which forms a first friction portion, and the nut-locking element comprises an end portion having a conical second abutment surface which is complementary to the conical first abutment surface, the conical second abutment surface forming a second friction portion arranged to rest supportingly against the first friction portion, wherein the end portion of the nut-locking element comprises an elongated, sleeve-shaped portion axially extending between the conical second abutment surface of the nut-locking element and the threaded portion of the nut-locking element, and having an axial through-bore with an internal diameter which is larger than that of the first threaded portion of the threaded bolt and is arranged to surround part of the first threaded portion and extend towards the nut, wherein a wall of the axial through-bore along the internal diameter is arranged to extend axially along and parallel to a center axis of the threaded bolt, and to face the first threaded portion of the threaded bolt between the second threaded portion and the nut, wherein the second threaded portion has a smaller pitch than the first threaded portion, and wherein the first threaded portion and the second threaded portion have same thread directions.

11. The arrangement according to claim 10, wherein the first threaded portion of the threaded bolt has an axial extent outside the nut sufficiently large to form an engagement portion for an axial-tension tool arranged to apply an axial tensioning to the threaded bolt at a distance from the nut during a tightening of the nut against a nearest one of the adjacent elements.

12. The arrangement according to claim 10, wherein the conical first abutment surface of the nut is conically tapering externally from an external engagement portion on a periphery of the nut, and the conical second abutment surface of the nut-locking element is conically tapering internally from the end portion of the nut-locking element.

13. The arrangement according to claim 10, wherein a periphery of the nut-locking element forms a coupling portion which is arranged to receive a screwing tool and is formed with an externally polygonal cross section.

14. The arrangement according to claim 13, wherein the coupling portion extends over an entire axial length of the nut-locking element.

15. The arrangement according to claim 10, wherein the first threaded portion of the threaded bolt and the threaded portion of the nut is formed with friction-reducing thread surfaces and/or a friction-reducing thread shape.

16. The arrangement according to claim 15, wherein the first threaded portion of the threaded bolt and the threaded portion of the nut are coated with an antifriction material.

17. The arrangement according to claim 10, wherein the threaded portion of the nut-locking element is formed in the axial through-bore in the nut-locking element.

18. The arrangement according to claim 10, wherein the threaded portion of the nut-locking element is formed as a non-through bore in the nut-locking element, the nut-locking element being formed with a closed outward-facing end portion and surrounding the second threaded portion.

\* \* \* \* \*